May 17, 1938.　　　J. S. DORSEY　　　2,117,409
AUTOMOBILE SEAT
Filed March 11, 1937　　　2 Sheets-Sheet 1
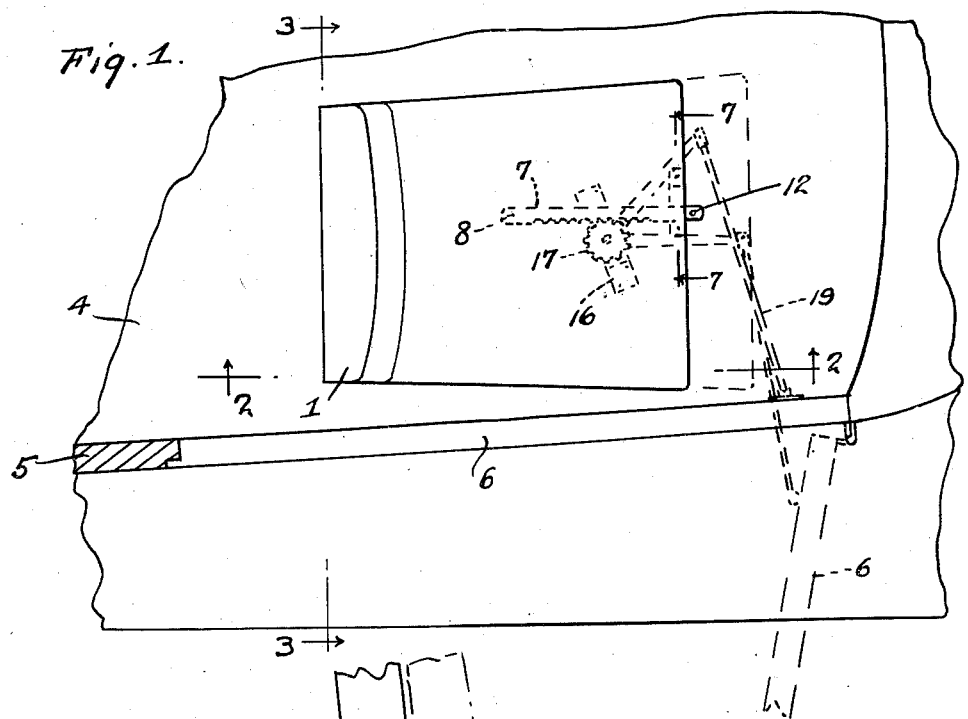
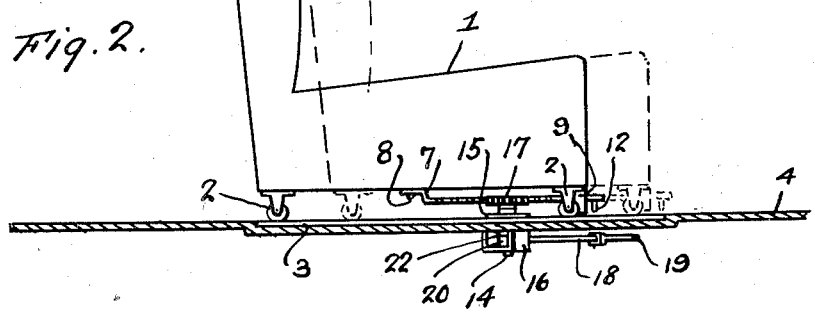
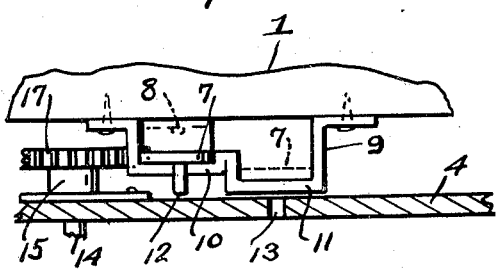
Inventor
J. S. Dorsey
By Clarence A. O'Brien
Hyman Berman
Attorneys May 17, 1938.  J. S. DORSEY  2,117,409
AUTOMOBILE SEAT
Filed March 11, 1937  2 Sheets-Sheet 2
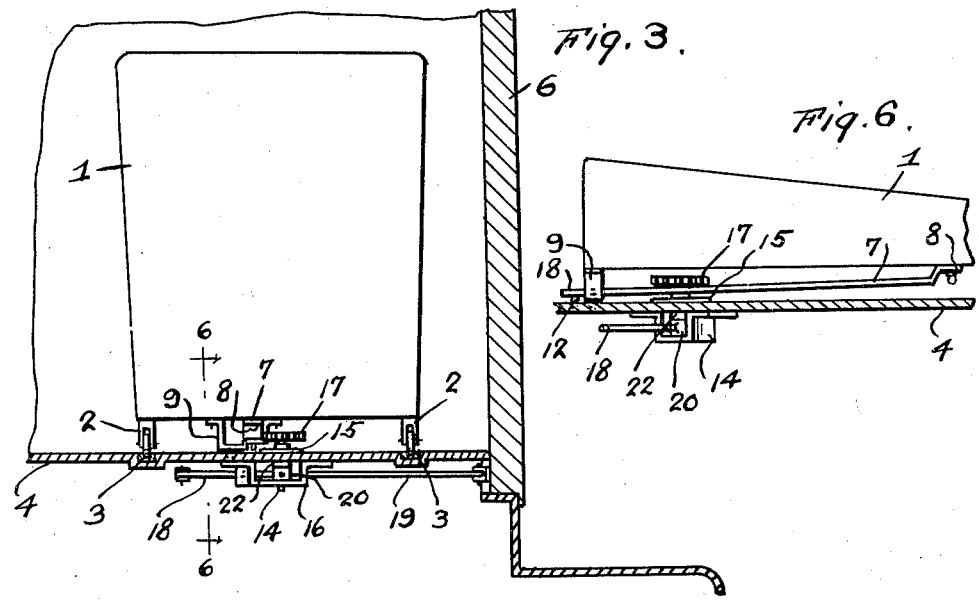
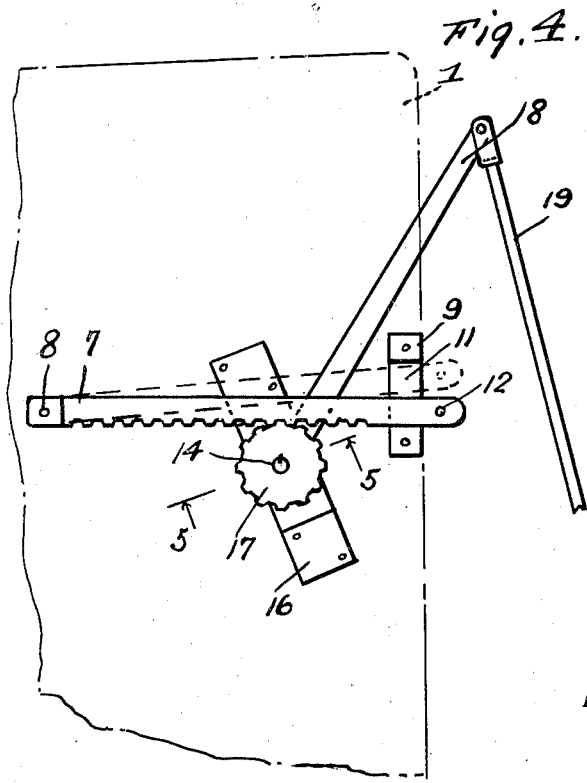
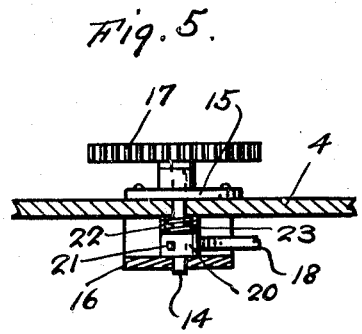
Inventor
J. S. Dorsey
By Clarence A. O'Brien
Hyman Berman
Attorneys Patented May 17, 1938

2,117,409

UNITED STATES PATENT OFFICE 2,117,409

AUTOMOBILE SEAT

John S. Dorsey, Wilmington, Del.

Application March 11, 1937, Serial No. 130,407

7 Claims. (Cl. 155—14)

The present invention relates to new and useful improvements in front seats for automobiles of what is commonly known as the coach type and has for its primary object to provide, in a manner as hereinafter set forth, novel means for operatively connecting the seat to the adjacent door of the vehicle for actuation thereby to facilitate the entrance and exit of rear seat passengers.

Another very important object of the invention is to provide novel means whereby the seat may be conveniently disconnected from the door and positively secured against sliding movement.

Other objects of the invention are to provide an automatic seat operating mechanism of the character described which will be comparatively simple in construction, strong, durable, highly efficient and reliable in use, compact, inconspicuous and which may be manufactured and installed at low cost.

All of the foregoing and still further objects and advantages of the invention will become apparent from a study of the following specification, taken in connection with the accompanying drawings wherein like characters of reference designate corresponding parts throughout the several views and wherein:

Figure 1 is a view in top plan of a slidable automobile seat equipped with the automatic operating mechanism constituting the present invention.

Figure 2 is a view in vertical longitudinal section through the floor of the vehicle, taken substantially on the line 2—2 of Fig. 1.

Figure 3 is a cross sectional view, taken substantially on the line 3—3 of Fig. 1, showing the invention in rear elevation.

Figure 4 is a top plan view of the invention.

Figure 5 is a view in vertical section, taken substantially on the line 5—5 of Fig. 4.

Figure 6 is a view in vertical longitudinal section, taken substantially on the line 6—6 of Fig. 3.

Figure 7 is a view in transverse section through the floor of the vehicle, taken substantially on the line 7—7 of Fig. 1.

Referring now to the drawings in detail, it will be seen that the reference numeral 1 designates the right front seat of an automobile of the coach type which is mounted on wheels 2 for longitudinal movement. Suitable tracks 3 are provided in the floor 4 of the vehicle body 5 for the wheels 2. The reference numeral 6 designates the right door of the automobile.

The embodiment of the present invention which has been illustrated comprises a rack bar 7 which is mounted longitudinally beneath the seat 1, said rack bar being pivotally connected at its rear end to said seat, as at 8. The free forward end of the rack bar 7 projects beyond the front of the seat 1 and is operable in a stirrup or the like 9 which is secured beneath said seat. As illustrated to advantage in Fig. 7 of the drawings, the stirrup 9 includes upper and lower pockets or recesses 10 and 11, respectively, for the reception of the forward end portion of the rack bar 7. There will be sufficient play in the pivotal connection 8 to permit the forward end portion of the rack bar 7 to drop into either of the pockets 10 or 11. Depending from the forward end portion of the rack bar 7 is a pin 12 which, when said rack bar is engaged in the pocket 11, is engageable in an opening 13 which is provided therefor in the floor 4 for securing the seat 1 against movement.

Extending rotatably through the floor 4 of the vehicle beneath the seat 1 is a vertical shaft 14. As best seen in Fig. 5 of the drawings, the upper portion of the shaft 14 is journaled in a suitable bearing 15 on the floor 4 and the lower end portion of said shaft is journaled in a suitable bracket 16 which is secured beneath said floor. Fixed on the upper end of the shaft 14 is a gear 17 with which the rack bar 7 is engageable when said rack bar is engaged in the pocket 10 of the stirrup 9, as shown to advantage in Fig. 4 of the drawings.

Fixed to the shaft 14, below the floor 4 of the vehicle, is an arm 18. A rod 19 operatively connects the arm 18 to the adjacent door 6 of the vehicle. Of course, the rod 19 is pivotally connected to the lower portion of the door 6.

It is thought that the operation of the invention will be readily apparent from a consideration of the foregoing. With the rack bar 7 engaged with the gear 17, the seat 1 is caused to move forwardly and rearwardly when the door 6 of the automobile is opened and closed. When it is desired to disconnect the seat 1 from the door 6 and secure said seat against movement, the free forward end portion of the rack bar 7 is swung from the upper pocket 10 of the stirrup 9 into the lower pocket 11 thereof and the pin 12 is engaged in the opening 13.

The end of the arm 18 which is secured to the shaft 14 is provided with an eye 20 accommodating said shaft. A set screw 21 secures the eye 20 to the shaft 14. A coil spring 22 encircles the shaft 14 and is compressed between the eye 20 and the floor 4 for taking up wear and preventing rattling. A tubular shield 23 incloses the spring 22.

It is believed that the many advantages of an automobile seat embodying the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. In a vehicle body including a hinged door, a seat mounted for longitudinal movement in the body, a shaft journaled in the body, means for connecting the shaft to the seat whereby rotation of the shaft in one direction will move the seat forwardly and rotation of the shaft in an opposite direction will move the seat rearwardly and means connecting the shaft with the door for rotating the shaft in one direction by opening movement of the door and in an opposite direction by closing movement of the door.

2. In combination with a vehicle body including a hinged door, a seat mounted for longitudinal movement in said body, a gear rotatably mounted in the body, a rack bar secured to the seat and engaged with the gear for actuation thereby, and means operatively connecting said gear to the door for actuation thereby.

3. In combination with a vehicle body including a hinged door, a seat mounted for longitudinal movement in the body, a shaft journaled vertically in the floor of the body, a gear fixed on said shaft, a rack bar secured to an underpart of the seat and engaged with said gear for actuation thereby, an arm fixed on the shaft, and a rod operatively connecting said arm to the door for actuation thereby, said rod, arm, shaft, gear and rack bar constituting means for connecting the seat to the door for actuation by said door.

4. In combination with a vehicle body including a floor and a hinged door, a seat mounted for longitudinal movement on said floor, a gear rotatably mounted on the floor, means operatively connecting said gear to the door for actuation thereby, a rack bar pivotally secured to the seat whereby the bar can be moved into engagement with the gear or swung out of engagement with said gear, the gear imparting movement to the bar when said bar is in engagement with the gear, for shifting the seat, and co-acting means on said rack bar and the floor for securing said seat against movement when said rack bar is disengaged from the gear.

5. In combination with a vehicle body including a floor and a hinged door, a seat mounted for longitudinal movement on said floor, a gear rotatably mounted on the floor, means operatively connecting said gear to the door for actuation thereby, a rack bar pivotally secured to the seat whereby the bar can be moved into engagement with the gear or swung out of engagement with said gear, the gear imparting movement to the bar when said bar is in engagement with the gear, for shifting the seat, and co-acting means on said rack bar and the floor for securing said seat against movement when said rack bar is disengaged from the gear, the last named means including a pin on one end portion of the rack bar, the floor having an opening therein for the reception of said pin.

6. In combination with a vehicle body including a floor and a hinged door, a seat mounted for longitudinal movement on said floor, a gear rotatably mounted on the floor beneath the seat, means operatively connecting said gear to the door for actuation thereby, a stirrup mounted beneath the seat and including upper and lower pockets, a rack bar mounted beneath the seat and pivotally connected thereto at one end, said rack bar being engageable with the gear for actuation thereby, the free end portion of the rack bar being operable in the stirrup and engageable in the pockets, and a pin on the free end portion of the rack bar engageable with the floor when said rack bar is engaged in the lower pocket for securing the seat against movement.

7. In a vehicle body including a hinged door, a seat mounted for longitudinal movement in the body, a shaft rotatably supported in the body, means for connecting the shaft with the seat whereby rotary movement in one direction of the shaft will move the seat forwardly and reverse rotation of the shaft will move the seat rearwardly and means for connecting the door with the shaft to rotate the shaft in the first mentioned direction when the door is open and in the reversed direction when the door is closed.

JOHN S. DORSEY.